(12) United States Patent
Igari (10) Patent No.: US 12,151,676 B2
(45) Date of Patent: Nov. 26, 2024

(54) RIDER-ASSISTANCE SYSTEM AND CONTROL METHOD FOR RIDER-ASSISTANCE SYSTEM

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 17/782,392

(22) PCT Filed: Nov. 17, 2020

(86) PCT No.: PCT/IB2020/060810
§ 371 (c)(1),
(2) Date: Jun. 3, 2022

(87) PCT Pub. No.: WO2021/111224
PCT Pub. Date: Jun. 10, 2021

(65) Prior Publication Data
US 2023/0008012 A1    Jan. 12, 2023

(30) Foreign Application Priority Data

Dec. 6, 2019    (JP) .................................. 2019-220993

(51) Int. Cl.
*B60W 30/09*    (2012.01)
*B60W 10/18*    (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0953; B60W 30/0956;
(Continued)

(56) References Cited

U.S. PATENT DOCUMENTS

2004/0098185 A1 * 5/2004 Wang .................... B62D 61/02
                                                    701/91
2009/0127835 A1 * 5/2009 Lin ...................... A41D 13/018
                                                    280/730.1

(Continued)

FOREIGN PATENT DOCUMENTS

DE    102012201802 A1    8/2013
DE    102012207981 A1    11/2013
(Continued)

OTHER PUBLICATIONS

International Search Report and Written Opinion for Application No. PCT/IB2020/060810 dated Oct. 2, 2021 (10 pages).

*Primary Examiner* — Sze-Hon Kong
(74) *Attorney, Agent, or Firm* — Michael Best & Friedrich LLP (57) ABSTRACT

To obtain a rider-assistance system capable of providing a rider of a straddle-type vehicle with a sense of comfort and safety during a turn, and a control method for such a rider-assistance system.
The present invention provides the rider-assistance system that assists with driving by the rider of the straddle-type vehicle and includes a controller. The controller includes: an object identification section that identifies an object approaching a side of the straddle-type vehicle on the basis of output of a communication device that wirelessly receives information output from infrastructure equipment or another vehicle; a body position information acquisition section that acquires position information of at least a part of a body of the rider on the turning straddle-type vehicle; a collision possibility determination section that determines a collision possibility of the rider with the object identified by the object identification section on the basis of the position information acquired by the body position information acquisition section; and a safety operation performing section that causes (Continued)

the rider-assistance system to perform safety operation in the case where the collision possibility determination section determines that the collision possibility is high.

15 Claims, 3 Drawing Sheets (51) Int. Cl.
| | |
|---|---|
| *B60W 10/20* | (2006.01) |
| *B60W 30/095* | (2012.01) |
| *B60W 40/04* | (2006.01) |
| *B60W 40/076* | (2012.01) |
| *B60W 40/09* | (2012.01) |
| *B60W 40/112* | (2012.01) |
| *B60W 50/00* | (2006.01) |
| *B60W 50/16* | (2020.01) |
| *H04W 4/40* | (2018.01) |
| *B60W 50/14* | (2020.01) |

(52) U.S. Cl.
CPC .... *B60W 30/0953* (2013.01); *B60W 30/0956* (2013.01); *B60W 40/04* (2013.01); *B60W 40/076* (2013.01); *B60W 40/09* (2013.01); *B60W 40/112* (2013.01); *B60W 50/0098* (2013.01); *B60W 50/16* (2013.01); *H04W 4/40* (2018.02); *B60W 2050/0083* (2013.01); *B60W 2050/143* (2013.01); *B60W 2050/146* (2013.01); *B60W 2300/36* (2013.01); *B60W 2520/18* (2013.01); *B60W 2540/18* (2013.01); *B60W 2540/223* (2020.02); *B60W 2552/30* (2020.02); *B60W 2556/45* (2020.02)

(58) Field of Classification Search
CPC .... B60W 40/04; B60W 40/076; B60W 40/09; B60W 40/112; B60W 50/0098; B60W 50/16; B60W 2050/0083; B60W 2050/143; B60W 2050/146; B60W 2300/36; B60W 2520/18; B60W 2540/18; B60W 2540/223; B60W 2552/30; B60W 2556/45; B60W 10/184; B60W 2520/10; B60W 2540/215; B60W 2554/80; B60W 2554/801; B60W 2556/65; B60W 40/08; B60W 50/14; B60W 30/095; H04W 4/40; G08G 1/166; B60Y 2200/12; B60Y 2300/09; B60Y 2300/095

See application file for complete search history.

(56) References Cited

U.S. PATENT DOCUMENTS

| | | | |
|---|---|---|---|
| 2013/0141576 A1* | 6/2013 | Lord | G08G 1/162 |
| | | | 348/148 |
| 2013/0142347 A1* | 6/2013 | Lord | H04R 29/005 |
| | | | 381/58 |
| 2016/0325739 A1* | 11/2016 | Litz | B60W 30/04 |
| 2017/0066492 A1* | 3/2017 | Arkhangelskiy | B60Q 1/0023 |
| 2017/0158118 A1* | 6/2017 | Lenker | B62J 6/057 |
| 2018/0265083 A1* | 9/2018 | Morotomi | B60W 30/18145 |
| 2019/0098953 A1* | 4/2019 | Strickland | G06V 20/58 |
| 2020/0171946 A1* | 6/2020 | Matsuda | B60W 30/16 |
| 2020/0276961 A1* | 9/2020 | Kaneta | B60T 8/26 |
| 2021/0166558 A1* | 6/2021 | Giraud | G08G 1/0133 |
| 2021/0197816 A1* | 7/2021 | Horn | B62J 50/22 |
| 2022/0169239 A1* | 6/2022 | Nose | B60W 30/09 |
| 2022/0212742 A1* | 7/2022 | Ogahara | B62J 45/412 |

FOREIGN PATENT DOCUMENTS

| | | |
|---|---|---|
| DE | 102016205139 A1 | 3/2017 |
| DE | 102015223012 A1 | 5/2017 |

* cited by examiner

RIDER-ASSISTANCE SYSTEM AND CONTROL METHOD FOR RIDER-ASSISTANCE SYSTEM

BACKGROUND OF THE INVENTION

The present invention relates to a rider-assistance system for assisting with driving by a rider of a straddle-type vehicle and to a control method therefor.

As a conventional rider-assistance system, the following rider-assistance system has been known. When a straddle-type vehicle turns, the rider-assistance system determines whether a rider's body sticks out of a lane, in which a straddle-type vehicle travels, on the basis of output of a surrounding environment detector mounted to the straddle-type vehicle. Then, in the case where it is determined that the rider's body sticks out, a controller performs safety operation. The surrounding environment detector detects surrounding environment of the straddle-type vehicle (for example, see JP-A-2015-522865).

SUMMARY OF THE INVENTION

Technical Problem

In the conventional rider-assistance system, the safety operation is performed even in the case where the rider of the straddle-type vehicle determines presence/absence of danger and then intentionally makes such a turn that at least a part of the body sticks out of the lane, in which the straddle-type vehicle travels. Accordingly, the rider may feel that the safety operation unnecessarily hinders driving.

The present invention has been made in view of the above-described problem as the background and therefore obtains a rider-assistance system capable of providing a rider of a straddle-type vehicle with a sense of comfort and safety during a turn, and a control method for such a rider-assistance system.

Solution to Problem

A rider-assistance system according to the present invention is a rider-assistance system that assists with driving by a rider of a straddle-type vehicle, and includes: a communication device that is mounted to the straddle-type vehicle and wirelessly receives information output from infrastructure equipment or a different vehicle from the straddle-type vehicle; and a controller that governs operation of the rider-assistance system. The controller includes: an object identification section that identifies an object approaching a side of the straddle-type vehicle on the basis of output of the communication device; a body position information acquisition section that acquires position information of at least a part of a body of the rider on the turning straddle-type vehicle; a collision possibility determination section that determines a collision possibility of the rider with the object identified by the object identification section on the basis of the position information acquired by the body position information acquisition section; and a safety operation performing section that causes the rider-assistance system to perform safety operation in the case where the collision possibility determination section determines that the collision possibility is high.

A control method for a rider-assistance system according to the present invention is a control method for a rider-assistance system that assists with driving by a rider of a straddle-type vehicle. The rider-assistance system includes: a communication device that is mounted to the straddle-type vehicle and wirelessly receives information output from infrastructure equipment or a different vehicle from the straddle-type vehicle; and a controller that governs operation of the rider-assistance system. The control method includes: an object identification step in which an object identification section of the controller identifies an object approaching a side of the straddle-type vehicle on the basis of output of the communication device; a body position information acquisition step in which a body position information acquisition section of the controller acquires position information of at least a part of a body of the rider on the turning straddle-type vehicle; a collision possibility determination step in which a collision possibility determination section of the controller determines a collision possibility of the rider with the object identified in the object identification step on the basis of the position information acquired in the body position information acquisition step; and a safety operation performing step in which a safety operation performing section of the controller causes the rider-assistance system to perform safety operation in the case where it is determined that the collision possibility is high in the collision possibility determination step.

Advantageous Effects of Invention

In the rider-assistance system and the control method for the rider-assistance system according to the present invention, the object identification section of the controller identifies the object approaching the side of the straddle-type vehicle, the body position information acquisition section of the controller acquires the position information of at least the part of the body of the rider on the turning straddle-type vehicle, the collision possibility determination section of the controller determines the collision possibility of the rider with the identified object on the basis of the position information, and the safety operation performing section of the controller causes the rider-assistance system to perform the safety operation in the case where the collision possibility determination section of the controller determines that the collision possibility is high. Accordingly, the safety operation is performed after presence or absence of danger is determined. Thus, it is possible to provide the rider with a sense of comfort and safety during a turn. Furthermore, the object identification section of the controller identifies the object that approaches the side of the straddle-type vehicle on the basis of the output of the communication device that receives the information output from the infrastructure equipment or the other vehicle. With such a configuration, it is possible to determine the collision possibility with the object existing at such a position that the surrounding environment detector cannot detect the object. As a result, the safety during the turn is improved.

DETAILED DESCRIPTION

A description will hereinafter be made on a rider-assistance system and a control method for the rider-assistance system according to the present invention with reference to the drawings.

A configuration, operation, and the like, which will be described below, merely constitute one example, and the rider-assistance system and the control method for the rider-assistance system according to the present invention are not limited to a case with such a configuration, such operation, and the like.

For example, a description will hereinafter be made on a case where the rider-assistance system according to the present invention is used for a two-wheeled motor vehicle. However, the rider-assistance system according to the present invention may be used for a straddle-type vehicle other than the two-wheeled motor vehicle. The straddle-type vehicle means a vehicle that a rider straddles. Examples of the straddle-type vehicle are a motorcycle (the two-wheeled motor vehicle or a three-wheeled motor vehicle) and a bicycle. The motorcycles include: the two-wheeled motor vehicle or the three-wheeled motor vehicle that has an engine as a propelling source; the two-wheeled motor vehicle or the three-wheeled motor vehicle that has a motor as the propelling source; and the like, and examples of the motorcycle are a bike, a scooter, and an electric scooter. The bicycle means a vehicle capable of traveling forward on a road by a depression force applied to pedals by the rider. The bicycles include a normal bicycle, an electrically-assisted bicycle, an electric bicycle, and the like.

The same or similar description will appropriately be simplified or will not be made below. In the drawings, the same or similar members or portions will be denoted by the same reference sign. In addition, a detailed structure will appropriately be illustrated in a simplified manner or will not be illustrated.

First Embodiment

A description will hereinafter be made on a rider-assistance system according to a first embodiment.
<Configuration of Rider-Assistance System>
A description will be made on a configuration of the rider-assistance system according to the first embodiment.

Figure 1:
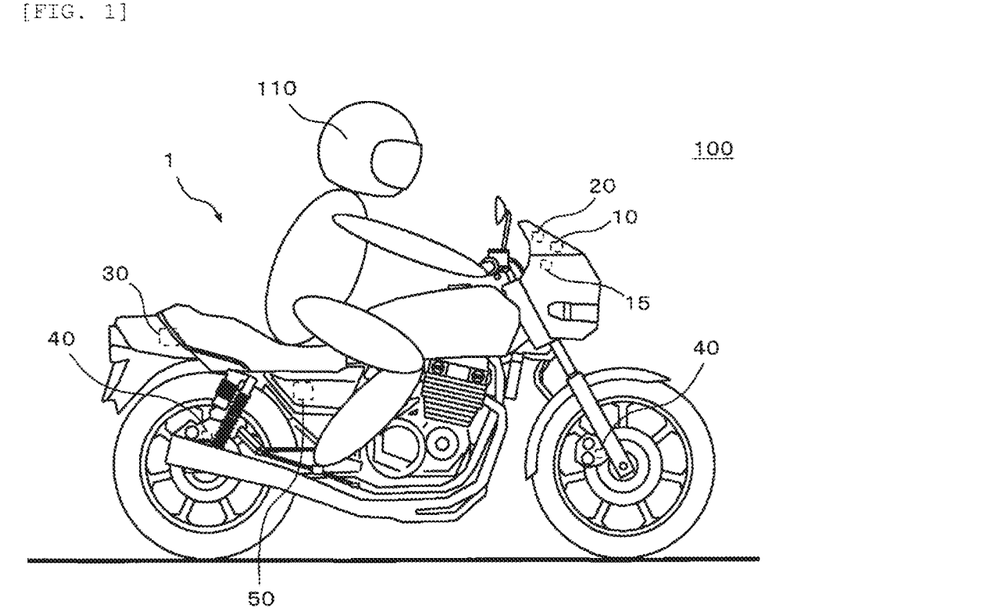
FIG. 1 is a view illustrating a state where a rider-assistance system according to a first embodiment of the present invention is mounted to a straddle-type vehicle.
Figure 2:
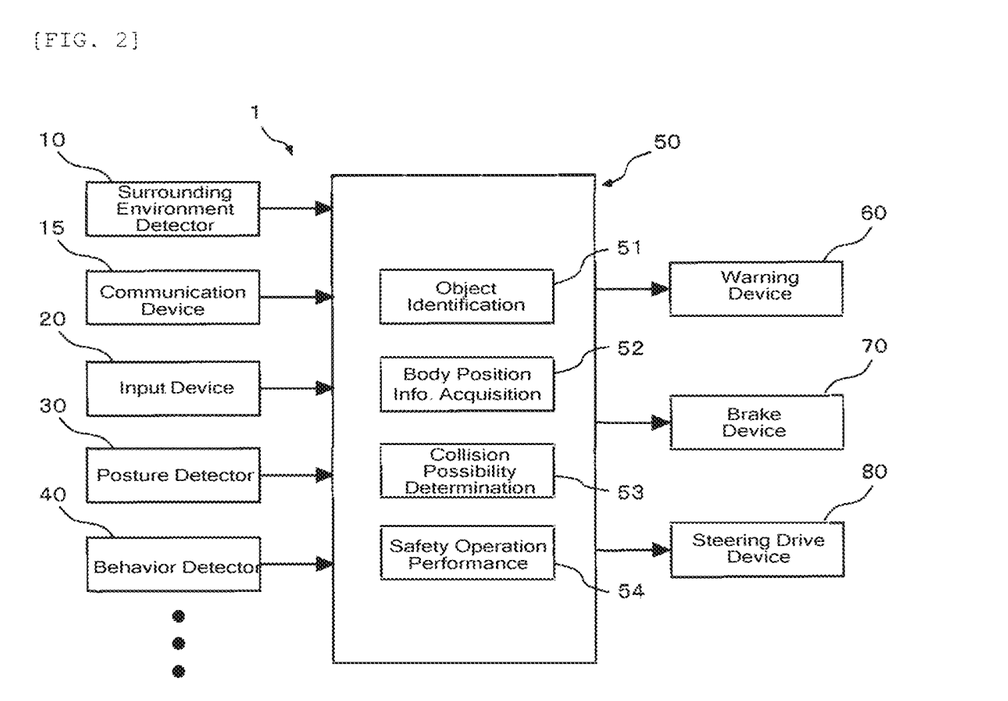
FIG. 2 is a diagram for illustrating a system configuration of the rider-assistance system according to the first embodiment of the present invention.
Figure 3:
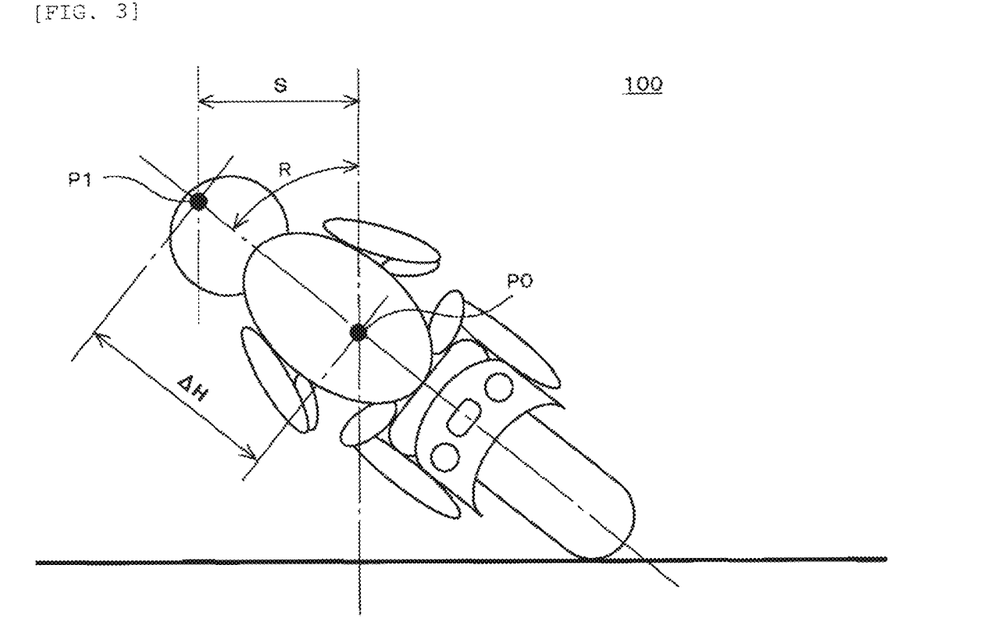
FIG. 3 is a view for illustrating processing by a body position information acquisition section in the rider-assistance system according to the first embodiment of the present invention.

FIG. 1 is a view of a state where the rider-assistance system according to the first embodiment of the present invention is mounted to the straddle-type vehicle. FIG. 2 is a diagram for illustrating a system configuration of the rider-assistance system according to the first embodiment of the present invention. FIG. 3 is a view for illustrating processing by a body position information acquisition section in the rider-assistance system according to the first embodiment of the present invention.

As illustrated in FIG. 1 and FIG. 2, a rider-assistance system 1 is mounted to a straddle-type vehicle 100. The rider-assistance system 1 includes a surrounding environment detector 10, a communication device 15, an input device 20, a posture detector 30, a behavior detector 40, and a controller 50.

In the rider-assistance system 1, the communication device 15 is used to recognize a target (for example, an oncoming vehicle, a parallel traveling vehicle, a preceding vehicle, a following vehicle, an obstacle, a lane, a traffic sign, or the like) located around the straddle-type vehicle 100, and information on the recognized target is supplied to the controller 50 in order to control operation of various devices (for example, a warning device 60, a brake device 70, a steering drive device 80, and the like) having functions of assisting with driving by the rider. Each of the devices in the rider-assistance system 1 may exclusively be used for the rider-assistance system 1, or may be shared with another system.

The surrounding environment detector 10 monitors surrounding environment of the straddle-type vehicle 100 and detects various types of information on the surrounding environment of the straddle-type vehicle 100. Examples of the surrounding environment detector 10 are a camera that captures images in front, behind, on a side, or the like of the straddle-type vehicle 100 and a distance measurement sensor capable of detecting a distance from the straddle-type vehicle 100 to the target that exists in front, behind, on the side, or the like of the straddle-type vehicle 100. A detection result of the surrounding environment detector 10 is output to the controller 50.

The communication device 15 wirelessly receives information that is output from infrastructure equipment or another vehicle located around the straddle-type vehicle 100. The communication device 15 may directly acquire such information from the infrastructure equipment or the other vehicle, or may indirectly acquire such information via relay equipment. Such information at least includes position information of an object that is located around the straddle-type vehicle 100. The position information includes information on a movement locus of the object when necessary. For example, the position information may be information on the object position (for example, a position of an object provided to a road, or the like) that is stored in a storage device of the infrastructure equipment, may be information on the object position (for example, a position of a vehicle that is a determination target of a collision possibility, which will be described below, the position of the object provided to the road, or a position of a pedestrian) that is acquired by a detector of the infrastructure equipment, may be information on the object position (for example, the position of the vehicle or the like) that is acquired by a detector of the vehicle as the determination target of the collision possibility, which will be described below, or may be information on the object position (for example, the position of the vehicle that is the determination target of the collision possibility, which will be described below, the position of the object provided to the road, the position of the pedestrian, or the like) that is acquired by a detector of a vehicle other than the vehicle as the determination target of the collision possibility, which will be described below.

The input device 20 accepts setting operations (for example, a selection operation, an input operation, and the like) by the rider and outputs information thereon to the controller 50. Here, in the straddle-type vehicle 100, as will be described below, the controller 50 can perform rider-assistance operation. The rider can perform the setting operation related to the rider-assistance operation by using the input device 20. As the input device 20, a lever, a button, a touchscreen, or the like is used, for example. The input device 20 is provided around a handlebar, for example. The input device 20 preferably includes a display screen that shows necessary information for the setting operation.

The posture detector 30 detects a posture of the straddle-type vehicle 100. Posture information detected by the posture detector 30 is output to the controller 50. The posture detector 30 is an inertial measurement unit that includes a three-axis gyroscope sensor and a three-directional acceleration sensor, for example. The posture detector 30 at least outputs roll angle information of the straddle-type vehicle 100. As illustrated in FIG. 3, a roll angle R is defined as a bank angle in a vehicle width direction with a standing state of the straddle-type vehicle 100 being a reference. The posture detector 30 may output the roll angle R itself as the roll angle information or may output another physical quantity that can substantially be converted to the roll angle R.

The behavior detector 40 detects behavior of the straddle-type vehicle 100. Behavior information detected by the behavior detector 40 is output to the controller 50. The behavior detector 40 includes a front-wheel rotational frequency sensor, a rear-wheel rotational frequency sensor, and the like, for example. The behavior detector 40 at least outputs body speed information of the straddle-type vehicle 100. The behavior detector 40 may output the body speed itself as the body speed information or may output another physical quantity that can substantially be converted to the body speed.

The controller 50 governs operation of the rider-assistance system 1. The controller 50 may partially or entirely be constructed of a microcomputer, a microprocessor unit, or the like, may partially or entirely be constructed of a member in which firmware or the like can be updated, or may partially or entirely be a program module that is executed by a command from a CPU or the like, for example. The controller 50 may be provided as one unit or may be divided into multiple units, for example.

As illustrated in FIG. 2, the controller 50 includes an object identification section 51, a body position information acquisition section 52, a collision possibility determination section 53, and a safety operation performing section 54.

The object identification section 51 identifies an object that approaches the side of the straddle-type vehicle 100 on the basis of the information output from the communication device 15. For example, the object identification section 51 identifies an adjacent lane to a lane in which the straddle-type vehicle 100 travels on the basis of the information output from the surrounding environment detector 10, a position signal of the GPS mounted to the straddle-type vehicle 100, or the like. Then, in the case where there is a vehicle that travels in such a lane, travels in an opposite direction from an advancing direction of the straddle-type vehicle 100, and approaches the straddle-type vehicle 100, that is, in the case where the oncoming vehicle is present, the object identification section 51 identifies such a vehicle as the object that approaches the side of the straddle-type vehicle 100. In addition, for example, the object identification section 51 identifies the adjacent lane to the lane in which the straddle-type vehicle 100 travels on the basis of the information output from the surrounding environment detector 10, the position signal of the GPS mounted to the straddle-type vehicle 100, or the like. Then, in the case where there is a vehicle that travels in such a lane, travels in the same direction as the advancing direction of the straddle-type vehicle 100, and approaches the straddle-type vehicle 100, that is, in the case where the parallel traveling vehicle is present, the object identification section 51 identifies such a vehicle as the object that approaches the side of the straddle-type vehicle 100. Furthermore, for example, the object identification section 51 identifies the lane in which the straddle-type vehicle 100 travels on the basis of the information output from the surrounding environment detector 10, the position signal of the GPS mounted to the straddle-type vehicle 100, or the like. Then, in the case where there is the obstacle (for example, the object provided to the road, the pedestrian, or the like) on the outside of the lane, in which the straddle-type vehicle 100 travels, in the advancing direction of the straddle-type vehicle 100, the object identification section 51 identifies such an obstacle as the object that approaches the side of the straddle-type vehicle 100. The object identification section 51 may not recognize a relationship between the lane and the object, that is, may identify the object entering a distance range, which is set in advance, in the vehicle width direction of the straddle-type vehicle 100 as the object that approaches the side of the straddle-type vehicle 100. The object that approaches the side includes: the object that moves toward the side of the straddle-type vehicle 100; and the object, a distance of which to the side of the straddle-type vehicle 100 is reduced by movement of the straddle-type vehicle 100.

The body position information acquisition section 52 acquires position information of at least a part of the rider on the turning straddle-type vehicle 100. The position information may be position information of a head (for example, a top of the head, a center position of the head, or the like) of the rider, may be position information of a shoulder of the rider, may be position information of a leg of the rider, may be position information of a hand of the rider, or may be a combination of those types of the position information. Hereinafter, there is a case where the part of the rider's body as an acquisition target of the position information by the body position information acquisition section 52 is referred to as an "acquisition target part P1".

The body position information acquisition section 52 may acquire, as the position information, a distance from a reference position (for example, a boundary line of the lane or the like) in a width direction of the lane, in which the straddle-type vehicle 100 travels, to the acquisition target part P1 of the rider, may acquire, as the position information, the lane in which the acquisition target part P1 of the rider is located, or may acquire, as the position information, whether the acquisition target part P1 of the rider is located in the lane, in which the straddle-type vehicle 100 travels.

As an example, the body position information acquisition section 52 acquires travel position information of the straddle-type vehicle 100. For example, the travel position information is acquired on the basis of the information output from the surrounding environment detector 10, the position signal of the GPS mounted to the straddle-type vehicle 100, or the like. For example, as illustrated in FIG. 3, the travel position information is information on a position of an attachment position P0 of the surrounding environment detector 10 or the GPS in the width direction of the lane, in which the straddle-type vehicle 100 travels. The body position information acquisition section 52 also acquires the roll angle information, which is generated on the straddle-type vehicle 100, on the basis of the output of the posture detector 30. Furthermore, the body position information acquisition section 52 acquires body frame information of the rider. The body frame information may be set by the rider using the input device 20 or may be assumed information that is set in advance as a fixed value. For example, in the case where the body position information acquisition section 52 acquires the position information of the rider's head, the assumed information is preferably generated with an assumption of the highest height or the highest seating height of the rider. Meanwhile, in the case where the rider sets the body frame information by using the input device 20, the body frame information is preferably information on a category of high or low of the height or the seating height of the rider, or is preferably a value of the actual height or the actual seating height. The body position information acquisition section 52 uses the body frame information to estimate a distance ΔH from the attachment position P0 to the acquisition target part P1 of the rider. Then, the body position information acquisition section 52 calculates displacement S by using the roll angle R and acquires, as the position information, information on the position of the acquisition target part P1 of the rider in the width direction of the lane, in which the straddle-type vehicle 100 travels.

As another example, the body position information acquisition section 52 acquires the travel position information of the straddle-type vehicle 100. For example, the travel position information is acquired on the basis of the information output from the surrounding environment detector 10, the position signal of the GPS mounted to the straddle-type vehicle 100, or the like. For example, as illustrated in FIG. 3, the travel position information is information on a position of the attachment position P0 of the surrounding environment detector 10 or the GPS in the width direction of the lane, in which the straddle-type vehicle 100 travels. In addition, the body position information acquisition section 52 acquires the body speed information, which is generated on the straddle-type vehicle 100, on the basis of the output of the behavior detector 40, and uses the body speed information and curve information of the lane, in which the straddle-type vehicle 100 travels, so as to estimate the roll angle information, which is generated on the straddle-type vehicle 100. The body position information acquisition section 52 may acquire the curve information of the lane on the basis of the output of the surrounding environment detector 10 or may acquire the curve information of the lane by using map information. Furthermore, the body position information acquisition section 52 acquires the body frame information of the rider. The body frame information may be set by the rider using the input device 20 or may be the assumed information that is set in advance as the fixed value. For example, in the case where the body position information acquisition section 52 acquires the position information of the rider's head, the assumed information is preferably generated with the assumption of the highest height or the highest seating height of the rider. Meanwhile, in the case where the rider sets the body frame information by using the input device 20, the body frame information is preferably the information on the category of high or low of the height or the seating height of the rider, or is preferably the value of the actual height or the actual seating height. The body position information acquisition section 52 uses the body frame information to estimate the distance ΔH from the attachment position P0 to the acquisition target part P1 of the rider. Then, the body position information acquisition section 52 calculates the displacement S by using the roll angle Rand acquires, as the position information, the information on the position of the acquisition target part P1 of the rider in the width direction of the lane, in which the straddle-type vehicle 100 travels.

In the above-described two examples, the body position information acquisition section 52 may not acquire the body frame information and may acquire the position information of the acquisition target part P1 of the rider only by using the travel position information and the roll angle information of the straddle-type vehicle 100. For example, in the case where the attachment position P0 approaches a boundary of the lane, in which the straddle-type vehicle 100 travels, and the large roll angle R in a direction toward the boundary is generated to the straddle-type vehicle 100, the body position information acquisition section 52 may acquire such position information that the acquisition target part P1 of the rider is located in the adjacent lane to the lane, in which the straddle-type vehicle 100 travels, without reference to the body frame information, or may acquire such position information that the acquisition target part P1 of the rider is located on the outside of the lane, in which the straddle-type vehicle 100 travels.

The description has been made so far on the case where the body position information acquisition section 52 estimates the position of the acquisition target part P1 only by using the body frame information on the assumption that a posture of the rider on the turning straddle-type vehicle 100 is the same as a standard posture of the rider on the traveling straddle-type vehicle 100 in the standing state. However, the body position information acquisition section 52 may correct the position of the acquisition target part P1, which is estimated by using the body frame information only, on the basis of the standard posture of the rider on the turning straddle-type vehicle 100, and may acquire the corrected position as the position information. Such correction preferably corresponds to the roll angle R generated to the straddle-type vehicle 100. In addition, the body position information acquisition section 52 may acquire an actually measured value of the distance ΔH from the attachment position P0 to the acquisition target part P1 of the rider. Such measurement is made by providing the straddle-type vehicle 100 with a camera, a distance measurement sensor, or the like capable of detecting a direction and the distance from the attachment position P0 to the acquisition target part P1 of the rider, for example.

The collision possibility determination section 53 determines a collision possibility of the rider with the object identified by the object identification section 51 on the basis of the position information acquired by the body position information acquisition section 52.

As an example, the collision possibility determination section 53 determines that the collision possibility of the rider is high in the case where the position information acquired by the body position information acquisition section 52 is information indicating that the acquisition target part P1 of the rider is located in the adjacent lane to the lane, in which the straddle-type vehicle 100 travels, and the object identification section 51 identifies the vehicle that travels in the adjacent lane and approaches the straddle-type vehicle 100.

As another example, the collision possibility determination section 53 determines that the collision possibility of the rider is high in the case where the position information acquired by the body position information acquisition section 52 is information indicating that the acquisition target part P1 of the rider is located on the outside of the lane, in which the straddle-type vehicle 100 travels, and the object identification section 51 identifies the obstacle that is located near the boundary of the lane on a near side of the acquisition target part P1 of the rider.

As further another example, the collision possibility determination section 53 determines that the collision possibility of the rider is high in the case where the movement locus of the vehicle identified by the object identification section 51 is predicted, and the acquisition target part P1 of the rider is located on such a locus.

As yet another example, the collision possibility determination section 53 determines that the collision possibility of the rider is high in the case where a movement locus of the acquisition target part P1 of the rider by the travel of the straddle-type vehicle 100 is predicted, and the obstacle identified by the object identification section 51 is located on such a locus.

In the case where the collision possibility determination section 53 determines that the collision possibility of the rider is high, the safety operation performing section 54 controls the operation of each of the devices mounted to the straddle-type vehicle 100 and thereby causes the rider-assistance system 1 to perform safety operation.

As an example, the safety operation performing section 54 uses the warning device 60 to perform warning operation to the rider. The warning device 60 may warn the rider by sound (that is, a sensation through an auditory organ as a sensory organ), may warn the rider by a display (that is, a sensation through a visual organ as the sensory organ), may warn the rider by vibration (that is, a sensation through a tactile organ as the sensory organ), or may warn the rider by a combination of those. The warning device 60 may be provided to the straddle-type vehicle 100 or may be provided to an accessory such as an article (for example, a helmet or the like) 110 worn by the rider that is associated with the straddle-type vehicle 100. In addition, the warning device 60 may be constructed of a single output device or may be constructed of multiple output devices of the same type or the different types. The multiple output devices may be provided integrally or may be provided separately. The warning device 60 may be substituted by another device. For example, the rider may be warned by the vibration when the brake device 70 automatically increases/reduces a braking force little by little.

As another example, the safety operation performing section 54 uses the brake device 70 to perform braking operation for automatically generating the braking force at least on a front wheel of the straddle-type vehicle 100. The safety operation performing section 54 may generate the braking force only on the front wheel of the straddle-type vehicle 100 or may generate the braking force on the front wheel and generate the smaller braking force than the braking force on the rear wheel. With such operation, the roll angle R generated to the straddle-type vehicle 100 is reduced.

As another example, the safety operation performing section 54 uses the steering drive device 80 to perform steering operation for automatically changing a steering angle of the steering of the straddle-type vehicle 100. The safety operation performing section 54 changes the steering angle in such a direction that the advancing direction of the straddle-type vehicle 100 deviates from the object.

<Operation of Rider-Assistance System>

A description will be made on the operation of the rider-assistance system according to the first embodiment.

Figure 4:
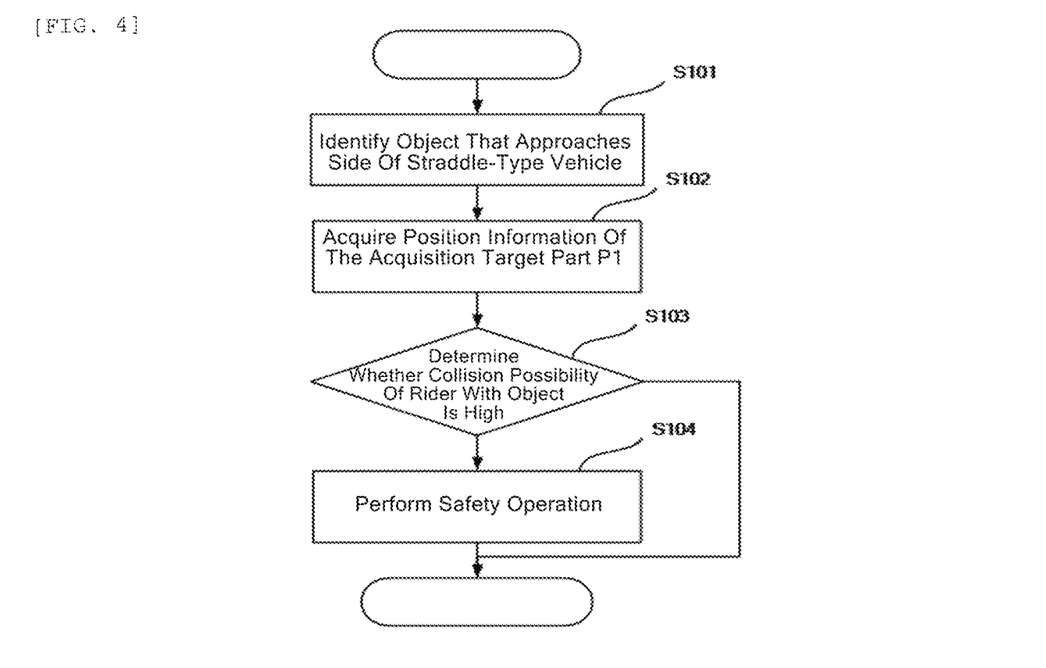
FIG. 4 is a chart illustrating an example of a control flow by a controller in the rider-assistance system according to the first embodiment of the present invention.

FIG. 4 is a chart illustrating an example of a control flow by a controller in the rider-assistance system according to the first embodiment of the present invention.

The controller 50 repeatedly executes the control flow illustrated in FIG. 4 while the rider-assistance operation is valid and the straddle-type vehicle 100 turns. Here, turning includes: turning that occurs when the straddle-type vehicle 100 travels along a curved travel lane; turning that occurs when the straddle-type vehicle 100 changes the lane; and turning that occurs when the straddle-type vehicle 100 changes the travel position in the current travel lane.

(Object Identification Step)

In step S101, the object identification section 51 of the controller 50 identifies the object that approaches the side of the straddle-type vehicle 100 on the basis of the information output from the communication device 15.

(Body Position Information Acquisition Step)

In step S102, the body position information acquisition section 52 of the controller 50 acquires the position information of the acquisition target part P1 of the rider on the straddle-type vehicle 100.

(Collision Possibility Determination Step)

In step S103, the collision possibility determination section 53 of the controller 50 determines whether the collision possibility of the rider with the object identified by the object identification section 51 is high on the basis of the position information acquired by the body position information acquisition section 52. If the collision possibility determination section 53 determines that the collision possibility is high, the processing proceeds to step S104. If not, the processing returns to step S101.

(Safety Operation Performing Step)

In step S104, the safety operation performing section 54 of the controller 50 controls the operation of each of the devices (for example, the warning device 60, the brake device 70, the steering drive device 80, and the like) mounted to the straddle-type vehicle 100 and thereby causes the rider-assistance system 1 to perform the safety operation.

<Effects of Rider-Assistance System>

A description will be made on effects of the rider-assistance system according to the first embodiment.

In the rider-assistance system 1, the controller 50 includes: the object identification section 51 that identifies the object approaching the side of the straddle-type vehicle 100; the body position information acquisition section 52 that acquires the position information of at least the part (the acquisition target part P1) of the body of the rider on the turning straddle-type vehicle 100; the collision possibility determination section 53 that determines the collision possibility of the rider with the object identified by the object identification section 51 on the basis of the position information acquired by the body position information acquisition section 52; and the safety operation performing section 54 that causes the rider-assistance system 1 to perform the safety operation in the case where the collision possibility determination section 53 determines that the collision possibility is high. Accordingly, the safety operation is performed after presence or absence of danger is determined. Thus, it is possible to provide the rider with a sense of comfort and safety during the turn. In addition, the object identification section 51 identifies the object that approaches the side of the straddle-type vehicle 100 on the basis of the output of the communication device 15 that receives the information output from the infrastructure equipment or the other vehicle. With such a configuration, it is possible to determine the collision possibility with the object existing at such a position that the surrounding environment detector 10 cannot detect the object. As a result, the safety during the turn is improved. However, the straddle-type vehicle 100 may not be provided with the surrounding environment detector 10.

Preferably, the object identification section 51 identifies, as the object, the vehicle that travels in the adjacent lane to the lane, in which the straddle-type vehicle 100 travels, and travels in the opposite direction from the advancing direction of the straddle-type vehicle 100. With such a configuration, for example, it is possible to appropriately prevent a frontal collision of the vehicle with the rider during the turn.

Preferably, the object identification section 51 identifies, as the object, the vehicle that travels in the adjacent lane to the lane, in which the straddle-type vehicle 100 travels, and travels in the same direction as the advancing direction of the straddle-type vehicle 100. With such a configuration, for example, it is possible to appropriately prevent a rear-end collision of the vehicle with the rider during the turn.

Preferably, the object identification section 51 identifies, as the object, the obstacle on the outside of the lane, in which the straddle-type vehicle 100 travels. With such a configuration, for example, it is possible to appropriately prevent a frontal collision of the obstacle with the rider during the turn.

Preferably, the body position information acquisition section 52 acquires the position information of at least the part of the body of the rider on the basis of the travel position information of the straddle-type vehicle 100 and the roll angle information generated to the straddle-type vehicle 100. With such a configuration, it is possible to determine the collision possibility by using the position information with a high degree of accuracy. As a result, the safety during the turn is improved.

In particular, the body position information acquisition section 52 may acquire the roll angle information on the basis of the output of the posture detector 30. In addition, the body position information acquisition section 52 may acquire the roll angle information on the basis of the body speed information of the straddle-type vehicle 100, which is acquired on the basis of the output of the behavior detector 40, and the curve information of the lane, in which the straddle-type vehicle 100 travels. With such a configuration, it is possible to determine the collision possibility by using the position information with the high degree of accuracy. As a result, the safety during the turn is improved.

In particular, the body position information acquisition section 52 preferably acquires the position information of at least the part of the body of the rider further on the basis of the body frame information of the rider. With such a configuration, it is possible to acquire the position information, in which an individual difference of the rider is taken into consideration and which has the high degree of accuracy. As a result, the safety during the turn is improved.

Preferably, the safety operation performing section 54 performs the warning operation to the rider as the safety operation. With such a configuration, it is possible to appropriately assist with recognition of the danger to the rider during the turn.

Preferably, the safety operation performing section 54 performs, as the safety operation, the braking operation for automatically generating the braking force only on the front wheel of the straddle-type vehicle 100 or the braking operation for automatically generating the braking force on the front wheel and automatically generating the smaller braking force than the braking force, which is generated on the front wheel, on the rear wheel of the straddle-type vehicle 100. With such a configuration, it is possible to automatically avoid the collision by raising the turning straddle-type vehicle 100. As a result, it is possible to ensure safety of the rider during the turn.

Preferably, the safety operation performing section 54 performs, as the safety operation, the steering operation for automatically changing the steering angle of the steering of the straddle-type vehicle 100. With such a configuration, it is possible to automatically avoid the collision by raising the turning straddle-type vehicle 100. As a result, it is possible to ensure the safety of the rider during the turn.

Second Embodiment

A description will hereinafter be made on a rider-assistance system according to a second embodiment.

<Configuration and Operation of Rider-Assistance System>

Figure 5:
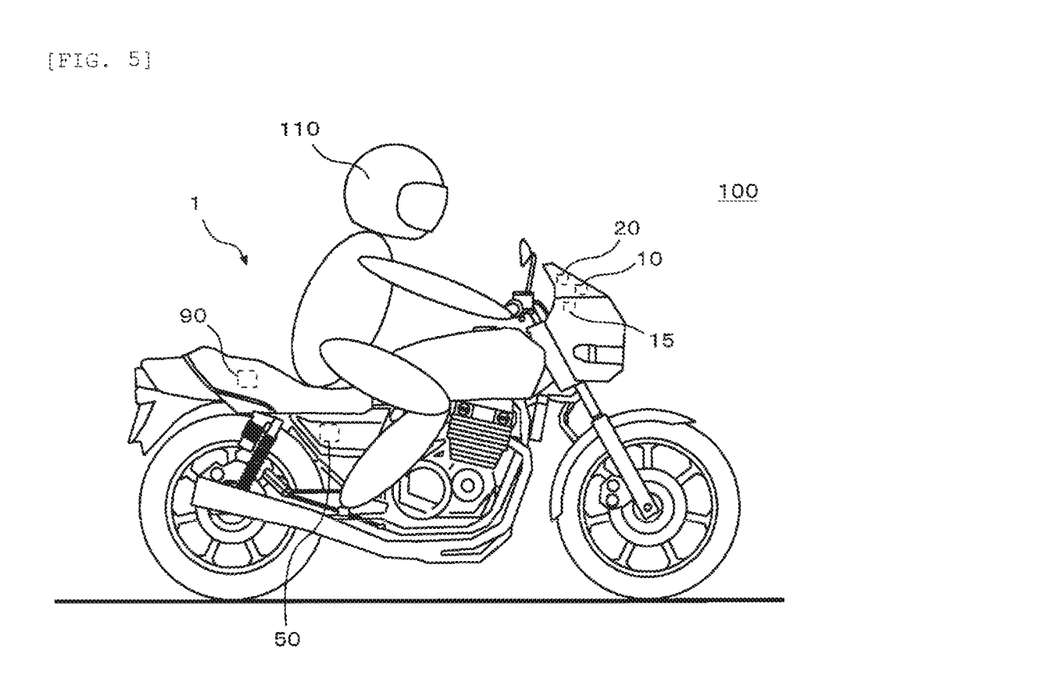
FIG. 5 is a view illustrating a state where a rider-assistance system according to a second embodiment of the present invention is mounted to a straddle-type vehicle.
Figure 6:
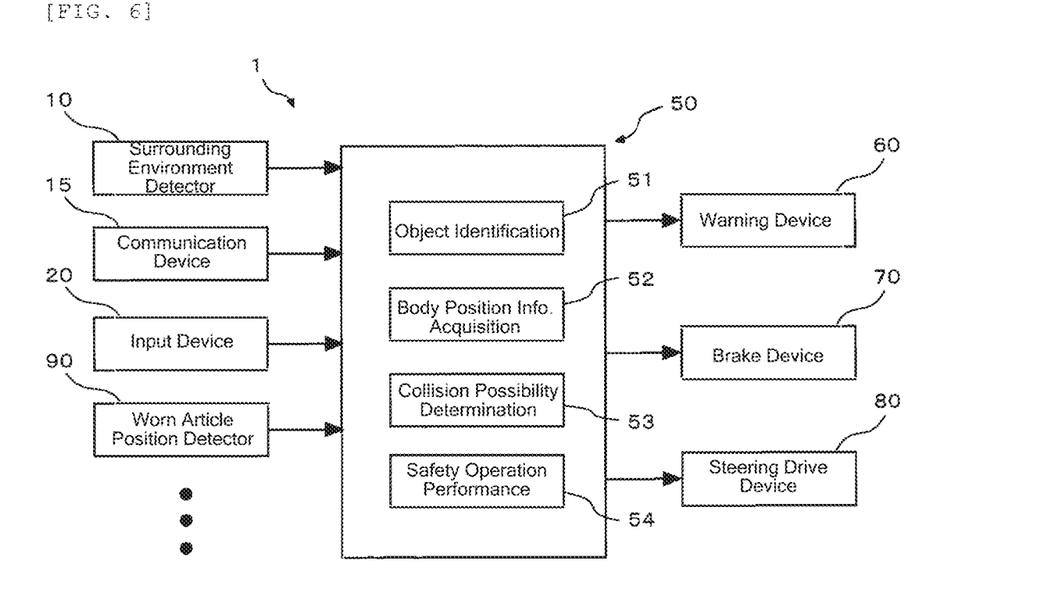
FIG. 6 is a diagram for illustrating a system configuration of a rider-assistance system according to the second embodiment of the present invention.

A description will be made on a configuration and operation of the rider-assistance system according to the second embodiment. FIG. 5 is a view of a state where the rider-assistance system according to the second embodiment of the present invention is mounted to the straddle-type vehicle. FIG. 6 is a diagram for illustrating a system configuration of the rider-assistance system according to the second embodiment of the present invention.

As illustrated in FIG. 5 and FIG. 6, the rider-assistance system 1 includes the surrounding environment detector 10, the input device 20, a worn article position detector 90, and the controller 50. Since the components other than the worn article position detector 90 and the body position information acquisition section 52 of the controller 50 are the same as those in the first embodiment, the description thereon will not be made.

The worn article position detector 90 detects a position of the article (for example, the helmet, shoulder protectors, boots, knee protectors, gloves, or the like) 110 worn by the rider. For example, the worn article position detector 90 is the camera, the distance measurement sensor, or the like mounted to the straddle-type vehicle 100 and capable of detecting a direction and a distance from the straddle-type vehicle 100 to the worn article 110. The worn article 110 preferably includes a component (for example, a marker, a reflector, a transmitter, or the like) that helps the detection thereof. Meanwhile, for example, the worn article position detector 90 is a receiver that receives a position signal of the GPS mounted to the worn article 110. That is, the worn article position detector 90 may detect a relative position of the worn article 110 to the straddle-type vehicle 100 or may detect the position of the worn article 110 in a world coordinate system.

The body position information acquisition section 52 acquires the position information of the worn article 110 of the rider as the position information of the acquisition target part P1 of the rider on the straddle-type vehicle 100. In the case where the worn article position detector 90 detects the relative position of the worn article 110 to the straddle-type vehicle 100, the body position information acquisition section 52 acquires the travel position information of the straddle-type vehicle 100 and, based on the travel position information and the output of the worn article position detector 90, acquires information on a position of the worn article 110 in the width direction of the lane, in which the straddle-type vehicle 100 travels, as the position information of the acquisition target part P1. In addition, in the case where the worn article position detector 90 detects the position of the worn article 110 in the world coordinate system, based on the output of the worn article position detector 90, the body position information acquisition section 52 acquires the information on the position of the worn article 110 in the width direction of the lane, in which the straddle-type vehicle 100 travels, as the position information of the acquisition target part P1.

<Effects of Rider-Assistance System>

A description will be made on effects of the rider-assistance system according to the second embodiment.

In the rider-assistance system 1, the controller 50 includes: the object identification section 51 that identifies the object approaching the side of the straddle-type vehicle 100; the body position information acquisition section 52 that acquires the position information of at least the part (the acquisition target part P1) of the body of the rider on the turning straddle-type vehicle 100; the collision possibility determination section 53 that determines the collision possibility of the rider with the object identified by the object identification section 51 on the basis of the position information acquired by the body position information acquisition section 52; and the safety operation performing section 54 that causes the rider-assistance system 1 to perform the safety operation in the case where the collision possibility determination section 53 determines that the collision possibility is high. Accordingly, the safety operation is performed after presence or absence of danger is determined. Thus, it is possible to provide the rider with the sense of comfort and the safety during the turn. In addition, the object identification section 51 identifies the object that approaches the side of the straddle-type vehicle 100 on the basis of the output of the communication device 15 that receives the information output from the infrastructure equipment or the other vehicle. With such a configuration, it is possible to determine the collision possibility with the object existing at such a position that the surrounding environment detector 10 cannot detect the object. As a result, the safety during the turn is improved. However, the straddle-type vehicle 100 may not be provided with the surrounding environment detector 10.

Preferably, the body position information acquisition section 52 acquires the position information on the basis of the output of the worn article position detector 90. With such a configuration, it is possible to determine the collision possibility by using the position information with the high degree of accuracy. As a result, the safety during the turn is improved.

The description has been made so far on the first embodiment and the second embodiment. However, the present invention is not limited to the description of each of the embodiments. For example, only a part of each of the embodiments may be implemented, or all or parts of the embodiments may be combined. In addition, for example, an order of step S101 and step S102 in the control flow illustrated in FIG. 4 may be switched. Furthermore, another step may be added to the control flow illustrated in FIG. 4.

REFERENCE SIGNS LIST

1: Rider-assistance system
10: Surrounding environment detector
15: Communication device
20: Input device
30: Posture detector
40: Behavior detector
50: Controller
51: Object identification section
52: Body position information acquisition section
53: Collision possibility determination section
54: Safety operation performing section
60: Warning device
70: Brake device
80: Steering drive device
90: Worn article position detector
100: Straddle-type vehicle
110: Worn article

The invention claimed is:

1. A rider-assistance system (1) that assists with driving by a rider of a straddle-type vehicle (100), the rider-assistance system comprising:
   a communication device (15) that is mounted to the straddle-type vehicle (100) and wirelessly receives information output from infrastructure equipment or a different vehicle from the straddle-type vehicle (100); and
   an electronic controller (50) that controls operation of the rider-assistance system (1),
   the electronic controller configured to:
      identify an object approaching a side of the straddle-type vehicle (100) on the basis of output of the communication device (15);
      acquire position information of an acquisition target part (P1), which is a part of a body of the rider when the straddle-type vehicle (100) turns;
      determine a collision possibility of the rider with the object by estimating a relative position relationship between the object and the acquisition target part (P1) on the basis of the position information; and
      control the rider-assistance system (1) to perform safety operation in the case where the collision possibility determination section (53) determines that the collision possibility is greater than a threshold.

2. The rider-assistance system according to claim 1, wherein the electronic controller is configured to identify, as the object, a vehicle that travels in an adjacent lane to a lane, in which the straddle-type vehicle (100) travels, and travels in an opposite direction from an advancing direction of the straddle-type vehicle (100).

3. The rider-assistance system according to claim 1, wherein the electronic controller is configured to identify, as the object, a vehicle that travels in an adjacent lane to a lane, in which the straddle-type vehicle (100) travels, and travels in the same direction as an advancing direction of the straddle-type vehicle (100).

4. The rider-assistance system according to claim 1, wherein the electronic controller is configured to identify, as the object, an obstacle on outside of a lane, in which the straddle-type vehicle (100) travels.

5. The rider-assistance system according to claim 1, wherein the electronic controller is configured to acquire the position information of the acquisition target part (P1) on the basis of travel position information of the straddle-type vehicle (100) and roll angle information generated to the straddle-type vehicle (100).

6. The rider-assistance system according to claim 5, wherein the electronic controller is further configured to:
   detect, using a sensor device mounted to the straddle-type vehicle (100), a posture of the straddle-type vehicle (100), and
   acquire the roll angle information on the basis of output of the sensor device.

7. The rider-assistance system according to claim 5, wherein the electronic controller is further configured to:
   detect, using a sensor device mounted to the straddle-type vehicle (100), behavior of the straddle-type vehicle (100), and
   acquire the roll angle information on the basis of body speed information of the straddle-type vehicle (100), which is acquired on the basis of output of the sensor device, and curve information of a lane, in which the straddle-type vehicle (100) travels.

8. The rider-assistance system according to claim 5, wherein the electronic controller is configured to acquire the position information of the acquisition target part (P1) further on the basis of body frame information of the rider.

9. The rider-assistance system according to claim 8, further comprising:
    an input interface (20) that receives a setting operation by the rider, wherein
    the electronic controller is configured to acquire the body frame information on the basis of the setting operation on the input interface (20).

10. The rider-assistance system according to claim 8, wherein the body frame information is set as a fixed value.

11. The rider-assistance system according to claim 1, wherein the electronic controller is further configured to
    acquire the position information of the acquisition target part (P1) on the basis of output of a sensor device that detects a position of an article (110) worn by the rider.

12. The rider-assistance system according to claim 1, wherein the electronic controller performs warning operation to the rider as the safety operation.

13. The rider-assistance system according to claim 1, wherein the electronic controller performs, as the safety operation, braking operation for automatically generating a braking force only on a front wheel of the straddle-type vehicle (100) or braking operation for automatically generating the braking force on the front wheel and automatically generating a smaller braking force than the braking force, which is generated on the front wheel, on a rear wheel of the straddle-type vehicle (100).

14. The rider-assistance system according to claim 1, wherein the electronic controller performs, as the safety operation, steering operation for automatically changing a steering angle of steering of the straddle-type vehicle (100).

15. A control method for a rider-assistance system (1) that assists with driving by a rider of a straddle-type vehicle (100),
    the rider-assistance system (1) including:
        a communication device (15) that is mounted to the straddle-type vehicle (100) and wirelessly receives information output from infrastructure equipment or a different vehicle from the straddle-type vehicle (100); and
        an electronic controller (50) that controls operation of the rider-assistance system (1),
    the control method comprising:
    an object identification step (S101) in which an object identification section (51) of the controller (50) identifies an object approaching a side of the straddle-type vehicle (100) on the basis of output of the communication device (15);
    a body position information acquisition step (S102) in which a body position information acquisition section (52) of the controller (50) acquires position information of at leastan acquisition target part (P1), which is a part of a body of the rider when the straddle-type vehicle (100) turns;
    a collision possibility determination step (S103) in which a collision possibility determination section (53) of the controller (50) determines a collision possibility of the rider with the object identified in the object identification step (S101), by estimating a relative position relationship between the object identified in the object identification step (S101) and the acquisition target part (P1) on the basis of the position information acquired in the body position information acquisition step (S102); and
    a safety operation performing step (S104) in which a safety operation performing section (54) of the controller (50) causes the rider-assistance system (1) to perform safety operation in the case where it is determined that the collision possibility is greater than a threshold in the collision possibility determination step (S103).

* * * * *